UNITED STATES PATENT OFFICE.

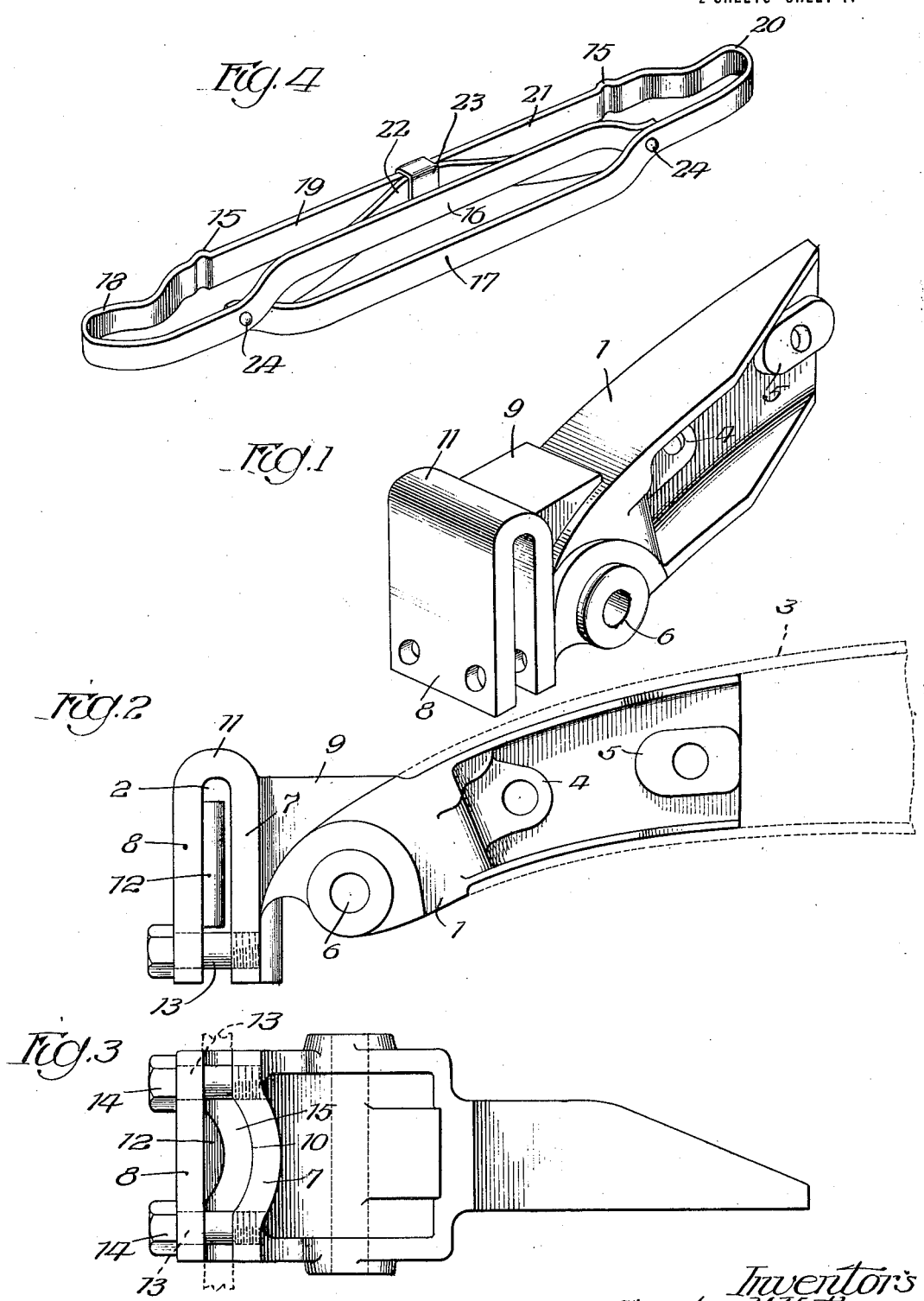

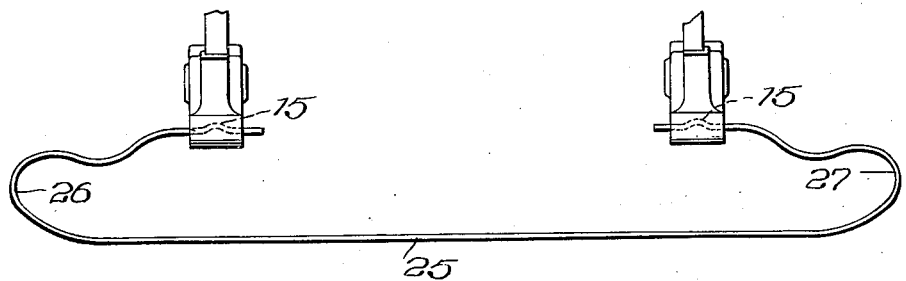
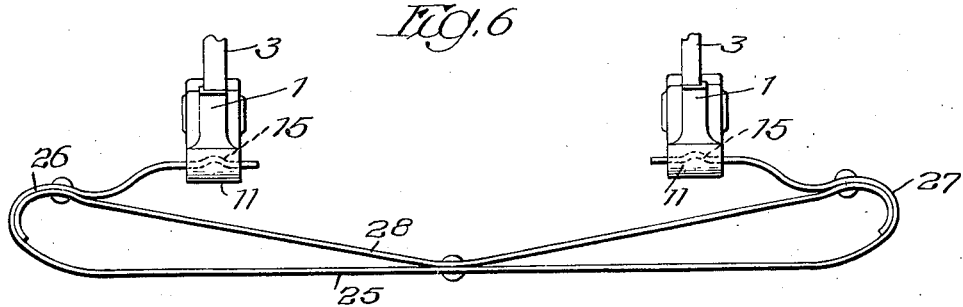
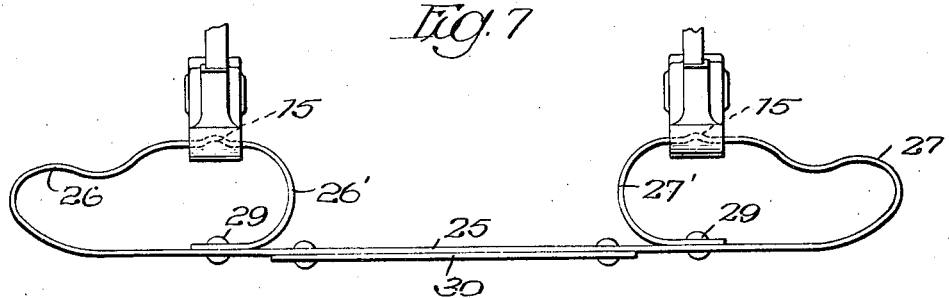
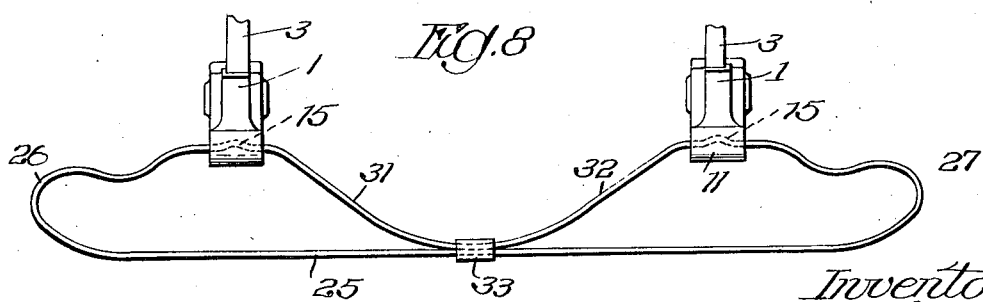

CHARLES H. HATHAWAY, OF WEST ALLIS, AND WILLIAM A. STARCK, OF MILWAUKEE, WISCONSIN, ASSIGNORS TO BADGER MANUFACTURING CORPORATION, OF MILWAUKEE, WISCONSIN, A CORPORATION OF DELAWARE.

BUMPER SUPPORT.

1,426,565.   Specification of Letters Patent.   Patented Aug. 22, 1922.

Application filed August 23, 1921. Serial No. 494,646.

*To all whom it may concern:*

Be it known that we, CHARLES H. HATHAWAY and WILLIAM A. STARCK, citizens of the United States, residing, respectively, at West Allis, in the county of Milwaukee and State of Wisconsin, and Milwaukee, in the county of Milwaukee and State of Wisconsin, have invented new and useful Improvements in Bumper Supports, of which the following is a specification.

This invention relates to a bumper support.

The bumper support comprises, in general, a shackle bracket, which fits within the channeled frame side bar of an automobile, and a clamp for attachment to an automobile bumper.

An object of this invention is to provide a simple, durable, strong and efficient bumper support, which may be manufactured at comparatively low cost, and easily and quickly fastened to an automobile frame and to an automobile bumper.

Another object is to provide a bumper support which will not readily work loose from the frame and bumper under the vibration to which both are subject.

Another object of the invention is to provide an automobile bumper support which may be embodied in the automobile during the manufacture thereof, and thus form a part thereof.

Another object is to provide an automobile shackle bracket, having an automobile bumper clamp formed integrally therewith.

Other objects and advantages will hereinafter appear.

The views of the drawings are:—

Fig. 1 is a perspective of the bumper support.

Fig. 2 is a side elevation of the bumper support.

Fig. 3 is a bottom plan of the bumper support.

Fig. 4 is a perspective of an automobile bumper, the supporting arms of which are crimped so as to register with the clamp of the bumper support.

Figs. 5 to 8 inclusive show different forms of automobile bumpers attached to the bumper support.

Figs. 1 to 3 will first be described.

The bumper support comprises a shackle bracket 1 and clamp 2 integral therewith.

The bumper support is cast from malleable iron, although it may be cast or made from any other suitable material.

The shackle bracket 1 is adapted to fit within the channeled side bar 3 of the automobile frame instead of the shackle bracket ordinarily employed to which is connected one of the springs supporting the frame.

The rear of the shackle bracket 1 is channeled so as to reduce the weight of the bracket, and the base of the channel is provided with two pads 4 and 5 having openings therein for receiving rivets or bolts, by which the bracket is rigidly fastened to the frame side bar 3.

The bracket 1, near the forward end thereof, is provided with a transverse opening 6 for receiving the shackle bolt of the shackle, by which the end of the automobile frame supporting spring is connected thereto.

The clamp 2 is formed integrally with the bracket 1 at the forward end thereof and is therefore rigidly fastened thereto.

The clamp 2 is U-shaped, the legs 7 and 8 forming the jaws thereof.

The jaw 7, which is rigidly and unyieldingly fastened to the bracket 1, as by web 9, has a vertical depression 10 in the face thereof.

The jaw 8 is resiliently connected with the jaw 7 and the bracket 1 through base 11 of the clamp.

The face of the jaw 8 is provided with a vertical projection 12 corresponding to the depression 10 within the face of the jaw 7.

The jaws 7 and 8 may be drawn into clamping engagement with a member positioned therebetween by means of bolts 13, the shanks of which extend through openings in the free end of the jaw 8, and are threaded into the jaw 7. The heads 14 of the bolts rest against the outer face of the jaw 8 and serve to force the jaw 8 toward the jaw 7 as the bolts are tightened.

The bumper bar, or other member to be positioned in the clamp and rigidly gripped thereby, is crimped so as to provide a crimped section 15 therein, with which the jaw projection 12 and depression 10 register.

Thus, the registering depressions and projections of the clamp and the crimp in the member to be clamped assist the clamp in preventing lateral displacement of the clamped member.

Fig. 4 shows an automobile bumper made of spring bar material and having two vertically spaced impact bars 16 and 17 forming an elongated loop.

The bar 16 terminates at one end of the elongated loop and extends from the other end thereof to form an integrally looped end 18, the rear arm 19 of which extends laterally and terminates approximately midway of the length of the bumper.

Likewise the impact bar 17 terminates at the opposite end of the elongated loop and extends from the other end thereof in an integral loop 20, the rear arm 21 of which extends laterally and terminates adjacent the end of the lateral arm 19.

A reinforcing curved bar 22 has its base positioned adjacent the ends of the lateral arms 19 and 21, and is rigidly fastened thereto by means of a clamp 23.

The diverging ends of the reinforcing bar 22 are rigidly fastened to the transverse impact bar of the bumper by means of rivets 24 which also serve to rigidly fasten together the two impact bars 16 and 17 which form the elongated loop in the transverse impact bar.

The bumper is fastened to an automobile frame by means of two of the combined brackets and clamps.

The rear transverse bar arms 19 and 21 are crimped to provide therein a crimped section 15 approximating in shape the curvature of the projection and depression in the jaws of the clamp.

When attaching the automobile bumper of Fig. 4 to an automobile equipped with the bumper support on the frame side bars thereof, the bolts 13 are withdrawn from the clamp and the rear transverse bars 19 and 21 of the bumper are arranged between the jaws of the clamps, with the crimps 15 registering with the clamp jaw depressions 10 and projections 12. The bolts 13 may then be inserted in the openings in the jaws of the clamp and tightened.

Thus, the bumper bar is gripped by the jaws of the clamp and the bumper is rigidly fastened to the automobile frame.

Fig. 5 shows a spring bar bumper having a transverse impact bar 25 provided with integral looped ends 26 and 27, in the rear arms of which are provided crimps which fit between the jaws of the bumper support fastened to the automobile frame side bar.

Fig. 6 shows a spring bar bumper, similar to the bumper of Fig. 5, provided with a reinforcing bar 28 fastened to the impact bar near the middle thereof, and having its free ends fastened to the integral looped ends 26 and 27 of the transverse impact bar. The free ends of the bar are curved to fit within the looped ends 26 and 27 and reinforce the same.

Fig. 7 shows a spring bar bumper, similar to that of Fig. 5, in which the rear lateral arms of the integral looped ends 26 and 27 are curved forwardly and then outwardly and fastened by means of rivets or bolts 29 to the impact bar 25.

These curved arms 26' and 27' fastened to the impact bar serve as reinforcing bars therefor.

A short impact bar 30 is fastened to the impact bar 25 intermediate the ends thereof and serves to strengthen the main impact bar.

Fig. 8 shows a spring bar bumper, similar to that of Fig. 5, in which the lateral rear arms of the integral looped ends 26 and 27 are extended forwardly and inwardly so as to form reinforcing bars 31 and 32 for the main impact bar.

The free ends of the reinforcing bars 31 and 32 are positioned adjacent the central section of the impact bar 25 and are rigidly fastened thereto by means of a clamp 33.

The bumpers of Figs. 5 to 8 inclusive are fastened to the bumper support in the same manner as previously described in connection with the bumper of Fig. 4.

The invention contained herein is, of course, susceptible of various embodiments and adaptations.

The invention claimed is:

1. A bumper supporting bracket for attaching a bumper to an automobile frame comprising an arm adapted to be received within a channeled frame side bar and fastened thereto, a pair of jaws, one of which is rigidly fastened to the arm, and means for drawing the jaws into clamping engagement with a bumper bar positioned therebetween, the jaws being provided with means to prevent lateral displacement of the bumper bar.

2. A bumper support for permanent attachment to an automobile channeled side bar and comprising an arm adapted to be received within the channeled side bar and fastened thereto and an integral clamp projecting beyond the end of the side bar and having jaws so formed as to prevent lateral displacement of a bumper bar clamped therebetween.

3. A bumper support for permanent attachment to an automobile channeled side bar and comprising an arm adapted to be received therein and rigidly fastened to the channeled side bar, an integral clamp projecting beyond the end of the side bar and having jaws for gripping a bumper bar positioned therebetween, one jaw having a depression in the face thereof, and a corresponding projection on the face of the other jaw.

4. A bumper supporting bracket for attaching a bumper to an automobile frame having in combination an arm adapted to be received within a channeled frame side bar and fastened thereto, and a pair of jaws, one of which is rigidly connected to the arm, one jaw having a depression in the face thereof, a corresponding projection on the face of the other jaw, and means for causing a bumper bar positioned between the jaws to be gripped between the depression and projection thereof.

5. A bumper support for attaching a bumper to an automobile frame comprising an arm adapted to be received within a channeled frame side bar and fastened thereto, a pair of jaws one of which is rigidly connected to the arm, the rigid jaw having a depression in the face thereof, a corresponding projection on the face of the other jaw, and means for causing the jaws to grip a bumper bar positioned therebetween, the bumper bar having a crimp therein with which the projection and groove of the jaws register.

6. An automobile fitting comprising a shackle bracket adapted to be received within the channeled frame side bar at the end thereof and fastened thereto and having an opening therein for receiving a shackle bolt, a clamp formed integrally with the shackle bracket and shaped so as to prevent lateral displacement of an automobile bumper bar embraced thereby.

7. A combined shackle bracket and clamp for fastening a bumper to an automobile frame comprising a pair of clamping jaws for gripping a bumper bar and so formed as to prevent lateral displacement of the clamped bar, and a bracket arm adapted to be received within a channeled frame side bar at the end thereof and rigidly fastened thereto.

8. An article of manufacture comprising a shackle bracket adapted to be received within a channeled frame side bar of an automobile, and a U-shaped clamp integral with the shackle bracket, the legs of the U-shaped clamp forming jaws for gripping an automobile bumper bar therebetween, the jaws being so formed as to prevent lateral displacement of the clamped bar.

9. An article of manufacture comprising an automobile fitting, having at one end thereof a bracket arm adapted to be received within a channeled frame side bar, and at the other end thereof a pair of clamping jaws adapted to grip an automobile bumper bar, the jaws being provided with complemental concave and convex faces so as to prevent lateral displacement of the clamped bar.

10. A clamp for rigidly fastening a bumper to an automobile frame comprising a pair of jaws, one jaw having a depression therein, a corresponding projection on the other jaw, means for drawing the jaws into clamping engagement with a bumper bar positioned between the depression and projection thereof, and a bracket arm projecting from one of the jaws adapted to be received within a channeled frame side bar and rigidly fastened thereto.

11. A combined bracket and clamp for rigidly fastening a bumper to an automobile frame comprising a U-shaped clamp whose legs form the jaws thereof, one jaw having a depression therein, a corresponding projection on the other jaw, means for causing the jaws to grip a bumper bar positioned therebetween, the bumper bar having a crimp therein with which the jaw projection and depression are adapted to register, and a bracket arm supporting the jaws and adapted to be received within a channeled frame side bar and rigidly fastened thereto.

In witness whereof we have hereunto subscribed our names.

CHARLES H. HATHAWAY.
WILLIAM A. STARCK.